United States Patent
Heuer et al.

(10) Patent No.: US 6,323,988 B1
(45) Date of Patent: Nov. 27, 2001

(54) ELECTROCHROMIC ASSEMBLY BASED ON POLY(3,4-ETHYLENE-DIOXYTHIOPHENE) DERIVATIVES WITH A COUNTERELECTRODE CONTAINING METAL OXIDES FROM TRANSITION GROUP VI OR VIII

(75) Inventors: Helmut-Werner Heuer; Rolf Wehrmann, both of Krefeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/320,987

(22) Filed: May 27, 1999

(30) Foreign Application Priority Data

May 29, 1998 (DE) .............................................. 198 24 127

(51) Int. Cl.$^7$ ................................. G02F 1/15; G02F 1/153
(52) U.S. Cl. ......................... 359/265; 359/273; 359/270
(58) Field of Search ...................................... 359/265, 273, 359/276, 245, 275, 296

(56) References Cited

U.S. PATENT DOCUMENTS

| | | | |
|---|---|---|---|
| 3,280,701 | 10/1966 | Donnelly et al. | 88/77 |
| 3,280,702 | 10/1966 | Hereth et al. | 89/1.805 |
| 4,887,890 | 12/1989 | Scherber et al. | 350/357 |
| 4,902,108 | 2/1990 | Byker | 350/357 |
| 5,140,455 | 8/1992 | Veraprasad et al. | 359/275 |
| 5,151,816 | 9/1992 | Varaprasad et al. | 359/275 |
| 5,164,855 * | 11/1992 | Buffat | 359/270 |
| 5,187,608 | 2/1993 | Blohm et al. | 359/273 |
| 5,300,575 | 4/1994 | Jonas et al. | 525/186 |
| 5,657,149 | 8/1997 | Buffat et al. | 359/275 |

FOREIGN PATENT DOCUMENTS 2265195  9/1999 (CA) .
96/03475  2/1996 (WO) .

OTHER PUBLICATIONS

Gmelins Handbuch der organischen Chemie, Verlag Chemie, 8th Ed., (month unavailable) 1966, pp. 376–495, Nickel und Sauerstoff.
P. M. S. Honk, R. Ho Martimer, Dr. Rossinsky, Electrochronism, VCH–Verlag, Weinheim, (month unavailable) 1995, pp. 59–92, A Inorganic Systems.
Electronique International No. 276, 16, Sep. 18, 1997, Saint–Gobain, Le Premier A Produire Des Verres Electrochromes? Laurence Plévert.

(List continued on next page.)

Primary Examiner—Scott J. Sugarman
Assistant Examiner—Michael A Lucas
(74) Attorney, Agent, or Firm—Joseph C. Gil; Richard E. L. Henderson

(57) ABSTRACT

The invention relates to electrochromic assemblies having a layer structure, characterized in that one layer is an electrically conductive, electrochromic polydioxythiophene and a further layer is an ion-storage compound selected or a mixture of ion-storage compounds of the formulae (I) to (XIV).

| | | | |
|---|---|---|---|
| $Me^1O$ | (I) | $Me^1(OH)_2$ | (IX) |
| $Me^1O_x$ | (II) | $Me^1O(OH)$ | (X) |
| $M_xMe^1O$ | (III) | $MMe^1O_2$ | (XI) |
| $M_xMe^1O_2$ | (IV) | $Me^1O_2$ | (XII) |
| $M_xMe^1O_y$ | (V) | $Me^1_2O_3$ | (XIII) |
| $Me^2O_3$ | (VI) | $Me^1_2O_3 \cdot H_2O$ | (XIV) |
| $M_xMe^2O_3$ | (VII) | | |
| $M_xMe^2_{(1-x)}O_3$ | (VIII) | | | where
$Me^1$ and $Me^2$ each represent a metal transition group VI or VII of the Mendeleev Periodic Table,
M represents a metal of main group I of the Mendeleev Periodic Table or a proton,
x represents a number from 0.001 to 5,
y represents a number from 0.001 to 5.

15 Claims, 4 Drawing Sheets

OTHER PUBLICATIONS

B. P. Jelle & G. Hagen, J. Electrochem. Soc., vol. 140, No. 12, Dec. 1993, pp. 3560–3564.
Transmission Spectra of an Electrochromic Window Based on Polyaniline, Prussian Blue and Tungsten Oxide.
Houben–Weyl, Methoden der organischen Chemie, vol. E20, Makromlekulare Stoffe, part 2, (month unavailable) 1887, pp. 1141–1143, λ) von Acryl–Verbindungen, Dr. Günter Schröer.
Solid State Ionics, NL, North Holland Publ. Co., Amsterdam, Bd. 69, Nr. 2, Jul. 1, 1994, Seiten 145–152, XP000574078, J. C. Gustafsson et al, "In Situ Spectroscopic Investigations of Electrochromism and Ion Transport in a Poly(3,4–Ethylenedioxythiophene) Electrode in a Solid State Electrochemical Cell".

Electrochemical Acta, GB, Elsevier Science Publishers, Barking, Bd. 40, Nr. 9, Jun. 1, 1995, Seiten 1101–1107, XP004019835, S. I. Cordoba De Torresi, "The Effect of Manganese Addition on Nickel Hydroxde Electrodes with Emphasis on its Electrochromic Properties".

* cited by examiner

ELECTROCHROMIC ASSEMBLY BASED ON POLY(3,4-ETHYLENE-DIOXYTHIOPHENE) DERIVATIVES WITH A COUNTERELECTRODE CONTAINING METAL OXIDES FROM TRANSITION GROUP VI OR VIII

BACKGROUND OF THE INVENTION

The present invention relates to electrochromic assemblies having controllable light transmittance, their production and their use.

The transparency of windows of vehicles in respect of electromagnetic radiation has hitherto not been able to be regulated. Phototropic glasses have hitherto been used only as glass in spectacles and have only a relatively small change in the transmission. Windows of buildings have hitherto been darkened by means of curtains, shutters, roller blinds or other movable mechanical elements. Electrochromic devices can thus be employed in a wide variety of ways. A brief overview of examples is as follows:

1. Vehicle glazing (windows or sunroofs of automobiles)

An electrochromic device is suitable as protection against sun or dazzling in motor vehicles. Front, side and rear windows or glass roofs can be included. The degree of darkening can be matched zone-wise and steplessly to the needs of the driver depending on the position of the sun and the immediate driving situation. Integration into a computer-controlled regulating system is possible. A combination of an active element with a laminated glass unit is likewise possible, for example application of a film system to the safety glass.

The transmittance of the windows can be controlled manually or automatically, which can be used for effective protection against dazzling during night driving, automatic adjustment of the level of brightness on driving into and out of tunnels and multistorey car parks and for protection against forced entry and theft when the vehicle is parked by preventing a view into the interior of the vehicle. Excessive heating of the interior in summer, particularly when the vehicle is parked can be prevented (cf. EP-A 0 272 428).

2. Glazing of buildings (electrochromic window)

In buildings, electrochromic assemblies are suitable for darkening side windows and skylights of buildings, living areas, workrooms or greenhouses as controllable sun protection (visible spectral region) and heat protection (IR region) and also for protection of the eyes (visible spectral region). For protection against break-ins, glazing of bank counters or shop windows can be darkened at the press of a button. Glass doors can automatically be made visible on the approach of persons in order to avoid injury. The ability to generate virtually all colours also makes it possible to incorporate the glazing architecturally into the facade of a building. The energy consumption for controlling the transparency of a large area of window is low, particularly when the memory effect of the system can be exploited and energy is only consumed in the switching phase. A combination with heat-protection glazing (K glass) is very well suited to achieving dynamic control of the sunlight shining through a window ("smart window"). Thus, an electrochromic system can contribute to regulating and limiting the energy required for air conditioning of buildings.

The power supply to the system can also be achieved by means of solar modules. A light-sensitive sensor can determine the intensity of the sunlight and thus control the light transmittance.

3. Display Elements

The ability to produce attractive colours and display any desired contours, e.g. letters, numbers, signs and symbols (able to be produced by appropriate structuring techniques) on a large area provides advertising with an interesting medium. Decorative and informative effects are readily possible.

Apart from the possibility of locating the system between panes of glass, there is also the alternative of using two or even only one transparent plastic film as support. This makes it possible to achieve placard-like advertizing materials with changeable information.

Electrochromic devices can be used for small display elements such as faces of watches and clocks or measuring instruments, displays for a wide variety of applications and for large display elements such as traffic signs, advertizing columns, information displays at railway stations and airports or for providing parking directions. Use as variable delineation system (marking of boundaries etc. on playing areas) in sports halls is likewise possible.

They can be used wherever information is to be made visible.

4. Optics

In optics, electrochromic systems can be used either in combination with glasses, lenses and filters of other optical instruments as well as sole active components. Use as fade-over protection for optical detection systems is likewise possible. The system is likewise suitable as a controllable filter system in photographic processes.

5. Mirrors

An electrochromic device can also be used as a dimmable mirror, e.g. in an automobile as external or rear-view mirror, which can be darkened by application of an electric potential and thus prevents dazzling by the headlights of other vehicles (cf., for example, U.S. Pat. No. 3,280,702, U.S. Pat. No. 4,902,108, EP-A 0 435 689, U.S. Pat. No. 5,140,455). A disadvantage of systems of the prior art (solution systems) is the colour in homogeneity after prolonged operation (segregation), particularly in the case of large mirrors (e.g. mirrors of goods vehicles). Increasing the viscosity of the solution system by addition of polymeric thickeners has been described (e.g. U.S. Pat. No. 4,902,108).

6. EMI Shielding

An electrochromic device can also be used as a variable filter element for modulating electromagnetic radiation in certain wavelength ranges.

Electrochromic devices usually comprise a pair of glass or plastic plates of which one is mirrored in the case of a mirror. One side of each of these plates is coated with a translucent electrically conductive layer, e.g. indium-tin oxide (ITO). These plates are used to construct a cell by fixing them with their conductively coated sides facing one another. The cell between the plates contains the electrochromic system and is closed tightly. The two plates can be separably connected to a power source and controlled via the conductive layer.

In the electrochromic solution systems known from the above-cited prior art, pairs of redox substances which after reduction or oxidation form coloured, positively or negatively charged free radicals which are chemically reactive are present in a solvent. Examples are the viologen systems which have been known for a long time.

As the pair of redox substances, use is made of one reducible and one oxidizable substance. Both are colourless or have only a slight colour. Under the action of an electric potential, one substance is reduced and the other is oxidized, with at least one becoming coloured. After the potential is switched off, the two original redox substances are formed again, with decolouration or lightening of the colour occurring.

It is known from U.S. Pat. No. 4,902,108 that pairs of redox substances in which the reducible substance has at least two chemically reversible reduction waves in the cyclic voltammogram and the oxidizable substance correspondingly has at least two chemically reversible oxidation waves are suitable. Systems of this type are suitable mainly for dimmable rear view mirrors of automobiles. Since these are solution systems, they are normally not suitable for use in electrochromic windows.

Also known are systems in which the actual electrochromic redox pair is dispersed in a polymer matrix (see, for example, WO-A 96/03475). The undesirable effect of segregation is suppressed in this way.

Combinations of inorganic electrochromic components such as $WO_3$, NiO or $IrO_2$ are likewise known and are possibilities as components in an electrochromic window (see, for example, U.S. Pat. No. 5,657,149, Electronique International No. 276, 16 (1997)).

These inorganic electrochromic components can be applied to the conductive substrate only by vapour deposition, sputtering or by a sol-gel technique. As a result, systems of this type are very expensive to produce. Efforts to replace one inorganic component by an organic polymer component have resulted in, for example, electrochromic systems based on the electrically conductive polymer polyaniline (PANI) and $WO_3$ as complementary electrochromic materials becoming known (see, for example, B. P. Jelle, G. Hagen, J. Electrochem. Soc., Vol. 140, No. 12, 3560 (1993)). An attempt has also been made to use systems without an inorganic component in which the ITO or $SnO_2$ layer (counterelectrode) is supposed to serve as complementary electrochromic component to substituted poly(3,4-alkylenedioxythiophenes) (U.S. Pat. No. 5,187,608).

However, it is found that such electrochromic assemblies are not able to ensure a sufficient number of switching cycles without a change occurring in the properties of the device.

SUMMARY OF THE INVENTION

The present invention provides an electrochromic assembly having a layer structure characterized in that one layer is an electrically conductive, electrochromic polydioxythiophene and a further layer is an ion-storage compound or a mixture of ion-storage compounds of the formulae (I) to (XIV)

| | | | |
|---|---|---|---|
| $Me^1O$ | (I) | $Me^1(OH)_2$ | (IX) |
| $Me^1O_x$ | (II) | $Me^1O(OH)$ | (X) |
| $M_xMe^1O$ | (III) | $MMe^1O_2$ | (XI) |
| $M_xMe^1O_2$ | (IV) | $Me^1O_2$ | (XII) |
| $M_xMe^1O_y$ | (V) | $Me^1{}_2O_3$ | (XIII) |
| $Me^2O_3$ | (VI) | $Me^1{}_2O_3.H_2O$ | (XIV) |
| $M_xMe^2O_3$ | (VII) | | |
| $M_xMe^2{}_{(1-x)}O_3$ | (VIII) | | | where $Me^1$ and $Me^2$ each represent a metal transition group VI or VIII of the Mendeleev Periodic Table, M represents a metal of main group I of the Periodic Table or a proton, x represents a number from 0.001 to 5, y represents a number from 0.001 to 5, $Me^1$ preferably represents nickel or iridium, $Me^2$ preferably represents molybdenum or tungsten.

Very particular preference is given to using the following ion-storage layers:

NiO
$NiO_x$
$Li_xNiO_2$
$Li_xNiO_y$
$H_yNiO_x$
$WO_3$
$Li_xWO_3$
$IrO_3$
$NiO_2$
$Ni(OH)_2$
NiO(OH)
$LiNiO_2$
$NiO_2$
$Ni_2O_3$
$Ni_2O_3.H_2O$
$MoO_3.$

The ion-storage layer can also be a mixture of at least two of the compounds (I) to (XIV).

In addition to compounds (I) to (XIV), the ion-storage layer can also contain the following compounds as part of a mixture:

$TiO_2$
$CeO_2$
$V_2O_5$, $Nb_2O_5$
$Li_xCeO_2$, $Li_xV_2O_5$
$Li_xTiO_2$
$Li_xNb_2O_5$

DETAILED DESCRIPTION OF THE INVENTION

Figure 1:
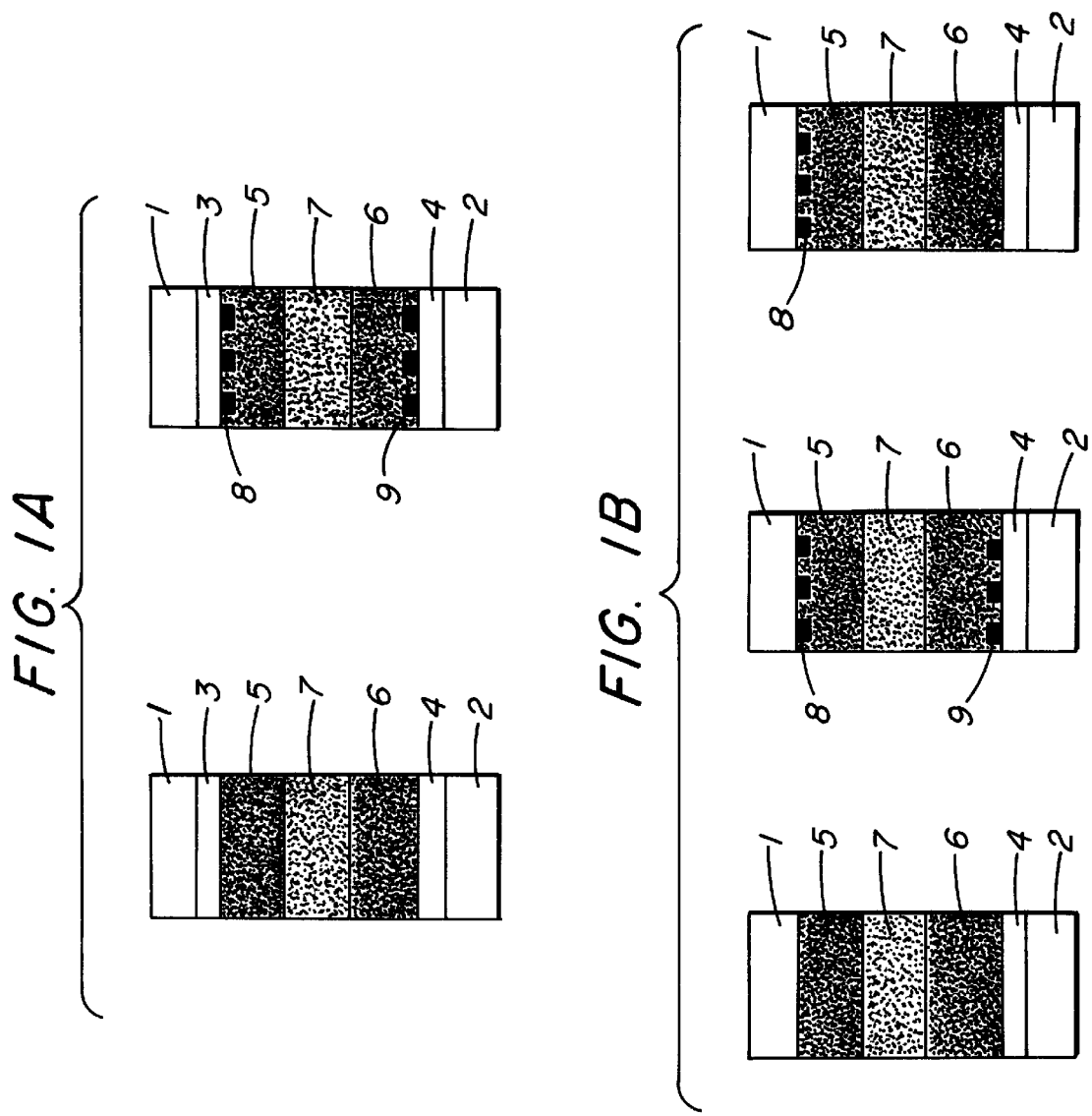
FIG. 1 illustrates the schematic structure of electrochromic assemblies according to the invention.

The ion-storage layer in the assembly of the invention thus comprises a metal oxide compound or a mixture of metal oxides. The ion-storage layers can include an Li salt when they are produced or else can be loaded electrochemically with Li ions afterwards.

The compounds of the formulae (I) to (XIV) are generally known compounds, are commercially available or can be prepared by generally known methods of inorganic chemistry (cf., for example, P. M. S. Honk, R. Ho Mortimer, D. R. Rosseinsky, Electrochronism, VCH-Verlag, Weinheim 1995).

Nickel oxides and hydrated nickel oxides are described in Gmelins Handbuch der organischen Chemie, Verlag Chemie, 8th Edition, 1966.

The electrochromic assembly of the invention thus contains at least one inorganic ion-storage layer. This can be applied either by means of a sol-gel process or by vapour deposition/sputtering or electrochemically to an electrically conductive substrate which may be provided with a metal grid to improve the conductivity. The layer can also comprise nanosize particles which can be applied by means of a casting technique.

The polydioxythiophenes are cationically charged and comprise structural units of the formula (XV)

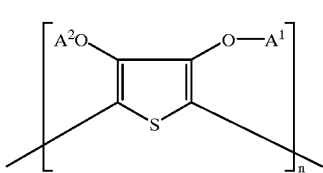

(XV)

where

A¹ and A² each represent, independently of one another, substituted or unsubstituted $(C_1-C_4)$-alkyl or together form substituted or unsubstituted $(C_1-C_4)$-alkylene, and n represents an integer from 2 to 10,000, preferably from 5 to 5000, in the presence of polyanions.

Preferred cationic polydioxythiophenes comprise structural units of the formula (XVa) or (XVb)

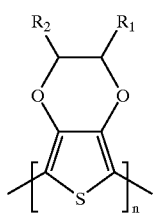

(XVa)

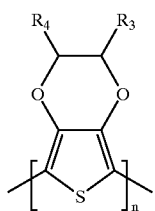

(XVb)

where $R_1$ and $R_2$ represent, independently of one another, hydrogen, substituted or unsubstituted $(C_1-C_{18})$-alkyl, preferably $(C_1-C_{10})$-, in particular $(C_1-C_6)$-alkyl, $(C_2-C_{12})$-alkenyl, preferably $(C_2-C_8)$-alkenyl, $(C_3-C_7)$-cycloalkyl, preferably cyclopentyl or cyclohexyl, $(C_7-C_{15})$-aralkyl, preferably phenyl-$(C_1-C_4)$-alkyl, $(C_6-C_{10})$-aryl, preferably phenyl or naphthyl, $(C_1-C_{18})$-alkyloxy, preferably $(C_1-C_{10})$-alkyloxy, for example methoxy, ethoxy, n- or iso-propoxy, or $(C_2-C_{18})$-alkyloxy ester and $R_3$, $R_4$ represent, independently of one another, hydrogen, but not both at the same time, or $(C_1-C_{18})$-alkyl, preferably $(C_1-C_{10})$-, in particular $(C_1-C_6)$-alkyl, $(C_2-C_{12})$-alkenyl, preferably $(C_2-C_8)$-alkenyl, $(C_3-C_7)$-cycloalkyl, preferably cyclopentyl or cyclohexyl, $(C_7-C_{15})$-aralkyl, preferably phenyl-$(C_1-C_4)$-alkyl, $(C_6-C_{10})$-aryl, preferably phenyl or naphthyl, $(C_1-C_{18})$-alkyloxy, preferably $(C_1-C_{10})$-alkyloxy, for example methoxy, ethoxy, n- or iso-propoxy, or $(C_2-C_{18})$-alkyloxy ester each of which are substituted by at least one sulphonate group, n represents a number from 2 to 10,000, preferably from 5 to 5000.

Very particularly preferably, the electrochromic assembly of the invention contains at least one electrically conductive, electrochromic cationic or uncharged polydioxythiophene of the formulae (XV a-1) and/or (XV b-1)

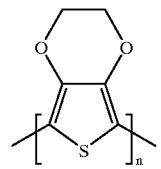

(XV a-1)

(XV b-1)

where $R_3$ is as defined above, n represents an integer from 2 to 10,000, preferably from 5 to 5000.

The polyanions are the anions of polymeric carboxylic acids such as polyacrylic acids, polymethacrylic acids or polymaleic acids or of polymeric sulphonic acids such as polystyrenesulphonic acids and polyvinylsulphonic acids. These polycarboxylic and polysulphonic acids can also be copolymers of vinylcarboxylic and vinylsulphonic acids with other polymerizable monomers such as acrylic esters and styrene.

The anion of polystyrenesulphonic acid is particularly preferred as counterion.

The molecular weight of the polyacids providing the polyanions is preferably from 1000 to 2,000,000, particularly preferably from 2000 to 500,000. The polyacids or their alkali metal salts are commercially available, e.g. polystyrenesulphonic acids and polyacrylic acids, or else can be prepared by known methods (see, for example, Houben-Weyl, Methoden der organischen Chemie, vol. E 20 Makromolekulare Stoffe, part 2, (1987), p. 1141 ff.).

In place of the free polyacids required for the formation of dispersions of polydioxythiophenes and polyanions, it is also possible to use mixtures of alkali metal salts of the polyacids and corresponding amounts of monoacids.

In the case of the formula (XV b-1), the polydioxythiophenes bear positive and negative charges in the structural unit. The preparation of the polydioxythiophenes is described, for example, in EP-A 0 440 957 (=U.S. Pat. No. 5,300,575).

The polydioxythiophenes are obtained by oxidative polymerization. As a result they acquire positive charges which are not shown in the formulae, since their number and position cannot be unambiguously determined.

The present invention accordingly provides an electrochromic assembly containing electrically conductive poly (3,4-ethylenedioxythiophene) derivatives as cathodically colouring electrochromic polymers and, in addition, suitable ion-storage layers for Li ions. A gel electrolyte comprising a crosslinked or uncrosslinked polymer, an Li salt and a certain amount of a solvent is located between the electrochromic polymer layer and the ion-storage layer. The schematic structure is shown in FIG. 1, principle I).

Legend for FIG. 1:

1,2: substrate 3,4: electrically conductive coating, of which one can act as a mirror 5: electrochromic polymer, e.g. PEDT/PSS
6: ion-storage layer
7: gel electrolyte (crosslinked or uncrosslinked)
8,9: fine metal grid (optional)

The electrochromic polymer layer is transparent in the doped state. This can be converted into a coloured form by uptake of electrons (reduction) at the cathode with an increase in the absorbance in the visible region of the spectrum. The oxidation which occurs on the opposite side (anode) is associated with an exchange reaction of the ion-storage layer with Li ions. However, this reaction barely contributes to the generation of colour, so that it does not interfere.

The present invention accordingly provides an electrochromic solid-state system containing at least one redox-active electrically conductive polymer selected from the group consisting of poly(3,4-ethylenedioxythiophene) derivatives which can, to enable them to be processed from solution, have been admixed with polystyrenesulphonate or bear a solubilizing sulphonate group in a side chain. This polymer layer is preferably applied from aqueous solution, in which case the solvent is evaporated to leave the solid, dry polymer film on the substrate. However, it should also be possible to apply it by screen printing. As substrates, preference is given to using an electrically conductive, transparent glass or film system where a layer of indium-tin oxide (ITO), fluorine-doped tin oxide (FTO, K-Glas), undoped tin oxide or a layer of finely divided silver serves as electrode. It is also possible for one electrode side to consist of a metal layer (e.g. Al, Cu, Pd) which is no longer transparent (for use in a mirror). The gel electrolyte contains at least one polymer (e.g. polyethylene oxide, PMMA), at least one Li salt (e.g. Li triflate, Li perchlorate) and at least one solvent (e.g. propylene carbonate).

The present invention provides for the use of the electrochromic assembly of the invention in the glazing of buildings or architectural glazing or sunroof in vehicles and also as display element, as electrochromic mirror (e.g. automatically dimmable rear view mirror in automobiles) and in various optical elements.

For use as a mirror, one of the two electrodes can consist of a vapour-deposited or electrochemically deposited metal layer, e.g. aluminium, silver, copper, platinum, palladium or rhodium.

The present invention also provides an electrochromic system in which the colour-producing electrochromic polymer compound functions simultaneously as its own electrode, as a result of which only a conductive coating of ITO, fluorine-doped tin oxide or a metal is -necessary. (see FIG. 1, principle II)).

Legend for FIG. 1, principle II:
1,2: substrate
4: electrically conductive coating which can also act as a mirror
5: electrochromic polymer
6: ion-storage layer
7: gel electrolyte (crosslinked or uncrosslinked)
8,9: fine metal grid (optional)

The electrochromic assembly is particularly notable for the fact that a combination with a heat-protection glass (commercially available for architectural glazing purposes) explicitly as a positive feature of the assembly is possible for saving energy in the case of brightly sunlit rooms. Further explicit electrodes of another material are thus unnecessary, since the heat-protection layer limits the transmission of IR radiation and at the same time, due to its electric conductivity, assumes the electrode function in the electrochromic assembly.

The electrochromic assembly of the invention is also notable for the fact that the electrochromic layer can also absorb IR radiation in certain ranges and can thus limit the passage of heat through the pane.

The electrochromic layer structure of the invention is suitable as a constituent of an electrochromic device. In an electrochromic device, the electrochromic assembly of the invention serves as a medium having variable transmission, i.e. the light transmittance of the system alters under the action of an electric potential as a result of it changing from a colourless to a coloured state. The present invention therefore also provides electrochromic devices containing an electrochromic assembly according to the invention. Applications of this electrochromic device are in architectural glazing and in vehicles, e.g. as window, automobile sunroof, rear view mirror in an automobile, display or as an optical element or as constituent of information display units such as instrument displays in vehicles of all types.

If the electrochromic device is a electrochromic display device, at least one of the two conductive layers or both is/are divided into electrically separate segments which are individually connected to a power source.

However, it is also possible for only one of the two plates to have a conductive coating and to be divided into segments. The segments can be separated, for example, by mechanical removal of the conductive layer, e.g. by scoring, scratching, scraping or milling, or by chemical means, for example by etching using, for example, a hydrochloric acid solution of $FeCl_2$ or $SnCl_2$. The location of this removal of the conductive layer can be controlled by means of masks, e.g. masks of photoresist. However, the electrically separate segments can also be produced by targeted, e.g. by means of masks, application, e.g. by sputtering or printing, of the conductive layer. The segments are connected to a power source by means of, for example, fine strips of conductive material so that the segment is electrically connected to a contact at the edge of the electrochromic device. These fine contact strips can consist of the same material as the conductive layer itself and can be produced together with it as described above, for example when it is divided into segments. However, they can also, e.g. to improve the conductivity, consist of another material such as fine metallic conductors, for example of copper or silver. A combination of metallic material and the material of the conductive coating is also possible. The metallic conductors can, for example, either be applied in fine wire form, e.g. adhesively bonded on, or be printed on. All these above-described techniques are generally known from the production of liquid-crystal displays (LCDs).

In the case of displays, the displays produced according to the invention can be viewed in transmitted light or in reflected light by means of mirroring.

If the electrochromic device is an electrochromic window, a fine metal grid can be vapour-deposited on one or both electrodes. This improves the surface conductivity of the substrates and is advantageous in the case of large areas in order to achieve uniform colouring.

The electrochromic assembly of the invention preferably contains at least one transparent electrically conductive coating comprising indium-tin oxide ($In_2O_3$: $SnO_2$ (ITO)), tin oxide ($SnO_2$), fluorine-doped tin oxide ($SnO_2$:F; FTO or "K-glass", "heat-protection glass"), antimony-doped tin oxide, antimony-doped tin oxide, aluminium-doped zinc oxide or a transparent metal film which is sufficiently thin, e.g. silver coating (heat-protection glass, e.g. ®PLANITHERM (Saint-Gobain)), on a substrate (glass or plastic).

Other conductive polymers such as substituted or unsubstituted polythienyls, polypyrroles, polyanilines, polyactetylene or polythiophenes can also be used.

In the assembly of the invention, the actual electrochromic polymer is advantageously also used as its own conductive electrode material in place of one of the abovementioned conductive coatings.

Very particular preference is given to using indium-tin oxide ($In_2O_3$:$SnO_2$ (ITO)), tin oxide ($SnO_2$), fluorine-doped tin oxide ($SnO_2$:F; FTO, "K-glass", "heat-protection glass") or a transparent silver coating which is sufficiently thin (heat-protection glass).

If one of the plates is mirrored, this conductive layer can also be utilized. Particular preference is here given to using silver, aluminium, copper, platinum, palladium and rhodium.

The electrochromic assembly of the invention preferably contains a transparent gel electrolyte comprising the following components:

polymer (crosslinked or uncrosslinked)

Li salt solvent or solvent mixture

Preferred polymers are polymethyl methacrylate (PMMA), polyethylene oxide (PEO), polyacrylonitrile (PAN), poly(N,N-dimethylacrylamide), poly(2-(2-methoxyethoxy)-ethoxy) phosphazene, poly(oxymethyleneoligo(oxyethylene)), polyethylene glycols (PEGs), polypropylene glycols (PPGs) or polymers based on polyepichlorohydrin or polyethers and also mixtures thereof. Copolymers such as ethylene oxide-propylene oxide (EO/PO) copolymers or oxymethylene-bridged polyethylene oxides are also suitable.

Particular preference is given to using polyethers and polyethylene oxides.

Particular preference is also given to photocrosslinkable polymer systems based on acrylates, e.g. polyethylene glycol 400 diacrylate, polyethylene glycol 400 dimethacrylate, polyethylene glycol 600 diacrylate, polyethylene glycol 600 dimethacrylate, polyethylene glycol methacrylate, tripropylene glycol diacrylate, tripropylene glycol monomethyl ether acrylate, trimethylolpropane triacrylate, ethylene glycol dimethacrylate, hydroxyethyl methacrylate (HEMA), hexanediol diacrylate, dianol diacrylate, tetraethylene glycol diacrylate, pentaerythritol triacrylate, pentaerythritol tetracrylate, butyl methacrylate and also the acrylates Roskydal® UAVPLS 2258 and Roskydal® UALPV 94/800 from Bayer AG and also their acrylate precursor from Bayer AG. The photocrosslinkable polymer systems should still be able to be cured in the presence of the solvent used and the Li salt with the aid of light activation by means of a customary photoinitiator such as ®Darocure 1173, 1116 or ®Irgacure 184 (E. Merck KGaA, Darmstadt) even between thick glass plates which are provided with a transparent electrically conductive coating. Illumination is carried out after filling the cell by irradiation with a suitable lamp (e.g. UV lamps such as Hg or Xe lamps). Curing of polymer systems by electron beam curing is likewise possible for the systems mentioned.

Very particular preference is also given to polymer systems which can be crosslinked thermally and catalytically via isocyanate groups with OH-functional polyether compounds, e.g. polyether polyols, to form polyurethanes. Polyurethanes having different soft segments, e.g. polytetramethylene glycol or polypropylene glycol, are also suitable.

Very particular preference is also given to modified siloxanes derived from, for example, gamma-glycidylpropyltrimethoxysilane. Variants modified by means of propylene oxide, for example, are also possible.

The gel electrolytes can also contain organic and/or inorganic fillers or additives. Here, the customary additives such as heat stabilizers, optical brighteners, flame retardants, flow improvers, fire retardants, dyes, pigments, fillers or reinforcing materials, finely divided minerals, fibres, chalk, quartz flour, glass, aluminium oxide, aluminium chloride and carbon fibres can be added in customary amounts. The function of a spacer can be performed, for example, by glass spheres, polymer particles, silica gel or sand grains having a defined size, should this be necessary.

Preferred Li salts are $LiClO_4$, $LiCF_3SO_3$, $LiN(SO_2CF_3)_2$, LiCl and $LiPF_6$.

Very particular preference is here given to $LiClO_4$, $LiCF_3SO_3$ and $LiN(SO_2CF_3)_2$.

Particularly preferred solvents are propylene carbonate, ethylene carbonate, acetonitrile and γ-butyrolactone and also mixtures thereof.

Very particular preference is given to using propylene carbonate and ethylene carbonate.

Substrates used in the electrochromic assembly of the invention are glass or various types of plastic.

Preference is given generally to transparent substrates of any type.

Apart from glass, specifically heat-protection glass when used as electrochromic window (in thicknesses of 10 µm in the case of "flexible glass, thin glass" to 3 cm), particularly preferred materials are polyesters (e.g. polyethylene terephthalate (PET) or polyethylene naphthalate (PEN)), various types of polycarbonate (e.g. ®Makrolon, APEC-HT), polysulphones, polyimides and polycycloolefins. The polymeric substrate can be used as flexible film or as a thick plate. The substrate can also be curved so that the assembly matches the shape of the material underneath. A flexible plastic substrate can also, after construction of the overall electrochromic system, be laminated or adhesively bonded onto various materials, e.g. curved glass.

The plastic substrates can additionally be provided with barrier layers against water and oxygen.

Preference is here given to $TiO_x$, $SiO_x$ on polyester, e.g. polyethylene terephthalate, or fluorinated polymers and possible combinations thereof and also barrier layers based on inorganic-organic hybrid systems.

The electrochromic assembly of the invention can, when configured as a flexible film system, be laminated or adhesively bonded as complete electrochromic composite system onto the safety glass of automobiles. In addition, it can be integrated into the hollow space of a double glazing system in buildings.

The control mechanism of the electrochromic assembly is based on the reversible electrochemical doping of the electrochromic polymer which results in great colour changes, for example from colourless to blue. The assembly is driven by means of defined voltages.

The reduction and oxidation processes in the electrochromic assembly of the invention generally occur by electron uptake and release at the cathode and anode, respectively, and the potential difference between the electrodes is preferably from 0.1 to 5 V, very particularly preferably from 0.1 to 3 V. After the electric potential is switched off, the previously achieved coloration can be maintained for some time (memory effect) so that permanent coloration can be achieved with minimum energy consumption. Charge equilibration and thus decoloration can be achieved by brief reversal of the polarity.

The electrochromic assembly of the invention can be supplied with power by means of solar modules, even in the case of relatively large areas.

In addition, it has been found that the electrochromic polymer film does not have to be produced in-situ on the electrically conductive substrate, but can be applied from an ecologically acceptable aqueous solution by a casting technique, by spin coating/dip coating, by screen printing or by spraying. This method is particularly suitable for systems having a large area.

To improve wetting of the substrates, it is also possible to add a wetting agent (e.g. Fluortensid)

EXAMPLES

Example 1
Application of an Electrochromic Polymer to an ITO Substrate

The polymer Baytron® P (aqueous dispersion of the conductive polymer PEDT/PSS, polyethylenedioxythiophene-polystyrenesulphonate from Bayer AG)

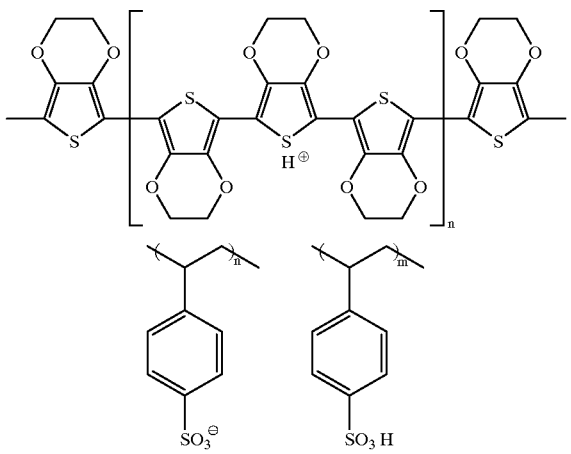

is applied from aqueous solution additionally containing isopropanol to the electrically conductive side of an ITO-glass plate (Merk-Balzers, Lichtenstein, surface resistance <15 ω/sq) by means of a spin coater, with four applications of 15 seconds each being made at a rotational speed of 1500 rpm. During application, the solvent is evaporated by means of a hair dryer.

This gives a transparent, only very slightly bluish polymer film. Measurement of the layer thickness by means of a profilometer gave a value of 0.6 μm.

EXAMPLE 2
Application of Baytron® P to K-Glass

Baytron® P (as in Example 1) is applied from aqueous solution to the electrically conductive side of a K-glass plate (heat-protection glass from Flachglas, surface resistance ~20 ω/sq) by means of a spin coater, with 4 applications of 15 seconds each being made at a rotational speed of 1500 rpm. During application, the solvent is evaporated by means of a hair dryer.

This gives a transparent, only very slightly bluish polymer film. Measurement of the layer thickness by means of a profilometer gave a value of 0.6 μm.

EXAMPLE 3
Application of an Ion-Storage Layer of Nickel Oxide to K-Glass

In an aqueous solution of nickel sulphate, $NiSO_4 \cdot 6H_2O$ (0.1 M) and ammonium hydroxide, $NH_4OH$ (0.1 M), hydrated nickel oxide is deposited anodically at a voltage of 3 V to the conductively coated $SnO_2$:F side of K-glass (time 10–20 seconds). The slightly brownish coating obtained in this way is subsequently heated at 200° C. for 1 hour. This gives completely transparent nickel oxide layers which are suitable as ion-storage layers in electrochromic assemblies.

EXAMPLE 4
Preparation of a Gel Electrolyte 1
The following mixture is produced:
7.0 g of acetonitrile
2.0 g of propylene carbonate (dry)
0.7 g of PMMA (Mw about 15,000)
0.3 g of $CF_3SO_3Li$ (from Aldrich)

After everything has dissolved, the solution is filtered once and is ready-to-use.

EXAMPLE 5
Preparation of a Gel Electrolyte 2
Procedure as in Example 6 but using the following:
7.0 g of acetonitrile
2.0 g of propylene carbonate
0.7 g of polyethylene oxide (PEO; Mw about 200,000)
0.3 g of $CF_3SO_3Li$ (from Aldrich)

EXAMPLE 6
Preparation of a Gel Electrolyte 1

7.7 g of the unsaturated aliphatic urethane acrylate Roskydal® UA VP LS 2258 (Bayer AG) are mixed with 0.1925 g (2.5% by weight) of photoinitiator Darocure 1173 from Merck Darmstadt, and 0.3 g (3% by weight) of lithium trifluoromethanesulphonate from Aldrich in 2 g of dry 1,2-propylene carbonate from Aldrich. This mixture is pourable and can be crosslinked photochemically, thus enabling a gel electrolyte which no longer flows to be prepared.

EXAMPLE 7
Preparation of a Gel Electrolyte Layer; Construction of the Electrochromic Cell 1 According to the Invention The still uncrosslinked gel electrolyte 3 from Example 6 is applied in a wet film thickness of 200 μm to the ion-storage layer from Example 3 and brought into contact with an electrochromic layer from Example 2. This composite is conveyed at a belt speed of 20 m/min under a UV lamp (IST lamp). This crosslinks the gel electrolyte and gives transparent systems containing a gel electrolyte which no longer flows.

EXAMPLE 8
(Comparison: Without Ion-Storage Layer)
Manufacture of a Complete Electrochromic Cell 2 and 3

Gel electrolyte 1 and 2 from Examples 4 and 5 are applied uniformly to the conductive side of ITO-glasses and brought into contact with the Baytron® P-coated sides of glass substrates from Example 1. This gives, in each case, an electrochromic assembly which is characterized in Example 9.

EXAMPLE 9
Cyclic Stability Test on the Electrochromic Cells 2 and 3

Figure 2:
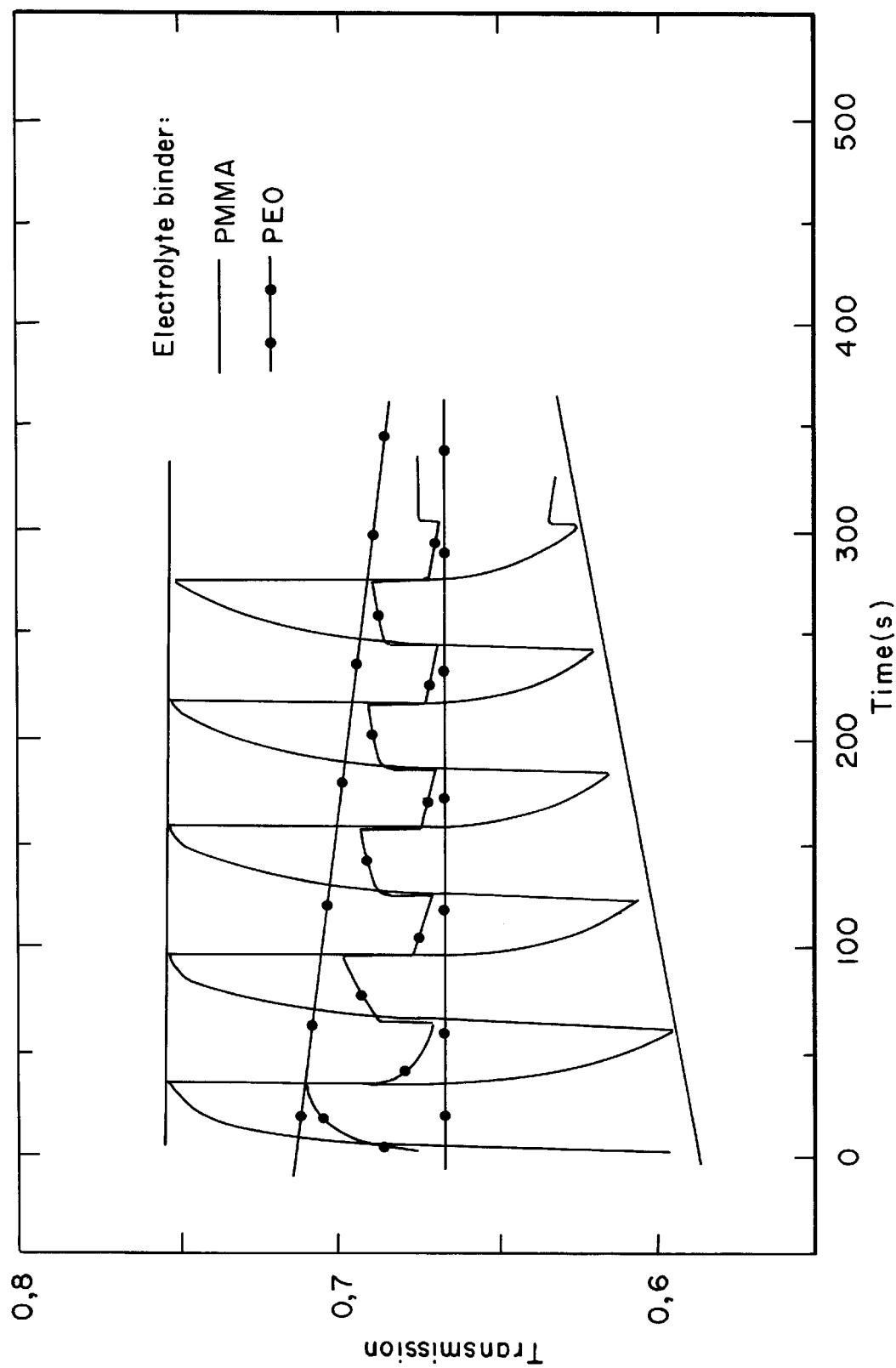
FIGS. 2, 3, and 4 illustrate the effect of electric current on the color of UV-stabilized cells prepared according to the invention.

A DC potential of 1.6 V is briefly applied to the ITO layers of the electrochromic comparison cells 2 and 3 from Example 8, before reversing the polarity of the electric potential. This results in cyclic coloration and decoloration of the cell. At the same time, the change in the transmission through the cell is observed as a function of time. It is found that assemblies which do not have another ion-storage layer in addition of ITO are not stable on cycling (see FIG. 2). This is to be improved by the present invention, as will be demonstrated in Example 10.

EXAMPLE 10

Cyclic Stability Test on the Electrochromic Cell 1

Figure 3:
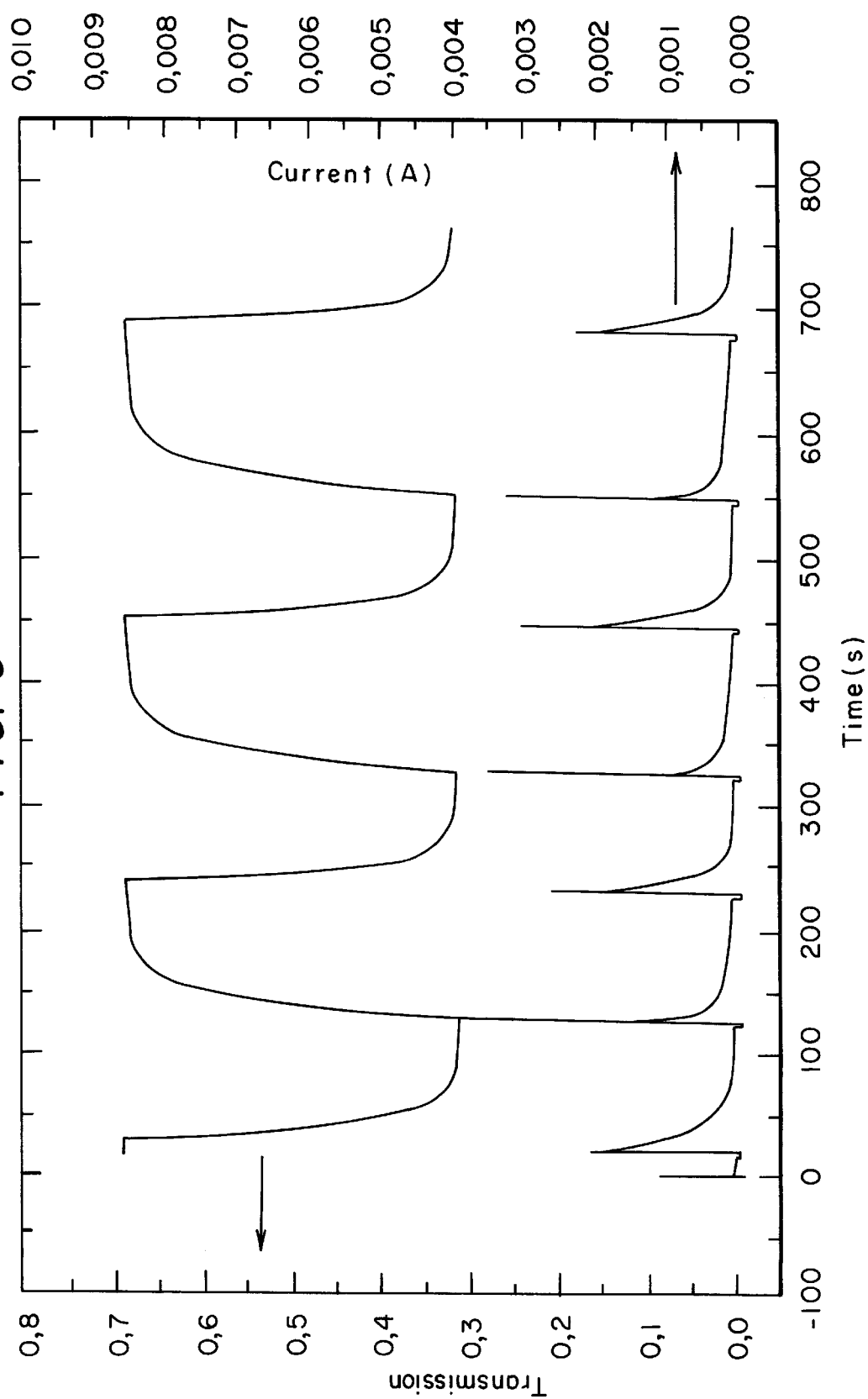
Figure 4:
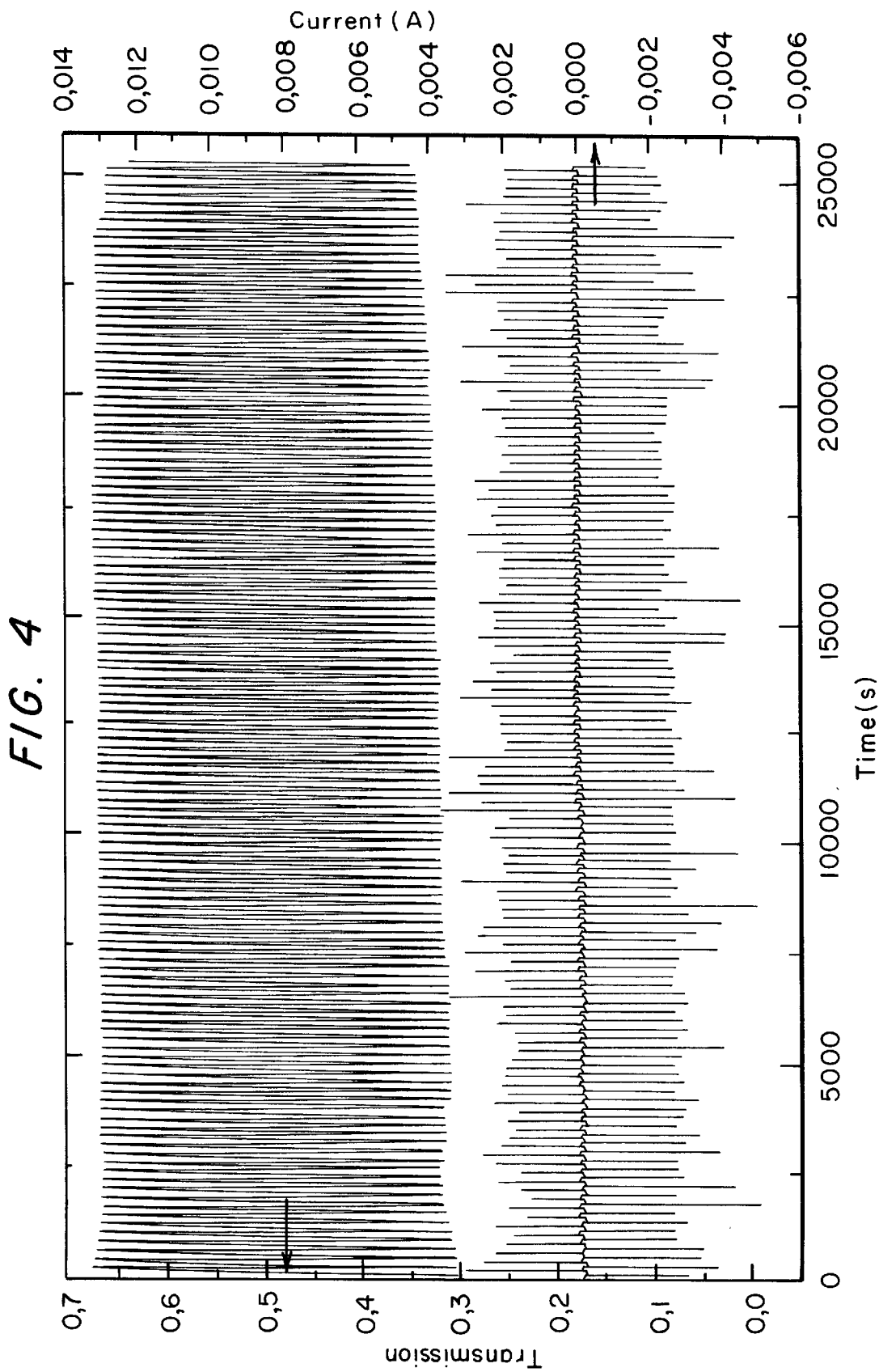

A DC potential of 2.5 V is briefly applied to the conductive layers of the coated K-glasses from Examples 2 and 3 in the electrochromic cell 1 from Example 7, before reversing the polarity of the electric potential. This results in cyclic coloration and decoloration of the cell. At the same time, the change in transmission through the cell is observed as a function of time. It is found that assemblies containing the nickel oxide ion-storage layer display a significant improvement in the cyclic stability compared with previous assemblies (see Examples 8 and 9) (cf. FIGS. 3 and 4). Even after a relatively large number of on/off cycles, virtually no change in the properties of the electrochromic assembly is found.

What is claimed is:

1. An electrochromic assembly comprising one or more layers, wherein one layer is an electrically conductive electrochromic polydioxythiophene and a further ion-storage layer is one or more ion-storage compounds selected from the group consisting of compounds having the formulas

| | |
|---|---|
| $Me^1O$ | (I), |
| $Me^1O_x$ | (II), |
| $M_xMe^1O$ | (III), |
| $M_xMe^1O_2$ | (IV), |
| $M_xMe^1O_y$ | (V), |
| $Me^2O_3$ | (VI), |
| $M_xMe^2O_3$ | (VII) |
| $M_xMe^2_{(1-x)}Me^2_xO_3$ | (VIII), |
| $Me^1(OH)_2$ | (IX), |
| $Me^1O(OH)$ | (X), |
| $MMe^1O_2$ | (XI), |
| $Me^1O_2$ | (XII), |
| $Me^1_2O_3$ | (XIII), and |
| $Me^1_2O_3 \cdot H_2O$ | (XIV), | wherein
$Me^1$ and $Me^2$ each represent a metal of transition group VI or VIII of the Mendeleev Periodic Table,
M represents a metal of main group I of the Mendeleev Periodic Table or a proton,
x represents a number from 0.001 to 5, and
y represents a number from 0.001 to 5.

2. An electrochromic assembly according to claim 1 wherein
$Me^1$ represents nickel or iridium, and
$Me^2$ represents molybdenum or tungsten.

3. An electrochromic assembly according to claim 1 wherein the ion-storage layer is one or more ion-storage compounds selected from the group consisting of compounds having the formulas
$NiO_x$,
$Ni(OH)_2$,
$NiO(OH)$,
$Ni_2O_3 \cdot H_2O$,
$Li_xNiO_y$,
$H_yNiO_x$,
$WO_3$,
$Li_xWO_3$,
$IrO_3$, and
$MoO_3$,
wherein
x represents a number from 0.001 to 5, and
y represents a number from 0.001 to 5.

4. An electrochromic assembly according to claim 1 wherein the ion-storage layer contains
$TiO_2$,
$CeO_2$,
$V_2O_5$, $Nb_2O_5$,
$Li_xCeO_2$, $Li_xV_2O_5$,
$Li_xTiO_2$—$Li_xV_2O_5$,
$Li_xTiO_2$, and/or
$Li_xNb_2O_5$,
wherein x represents a number from 0.001 to 5.

5. An electrochromic assembly according to claim 1 wherein the electrically conductive electrochromic polydioxythiophene comprises structural units of the formula (XV)

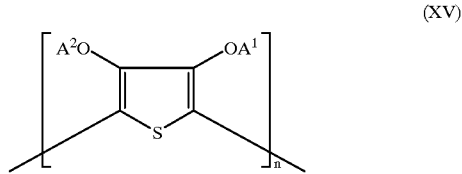

(XV)

wherein
$A^1$ and $A^2$ represent, independently of one another, substituted or unsubstituted $(C_1-C_4)$-alkyl or together form substituted or unsubstituted $(C_1-C_4)$-alkylene, and
n represents an integer from 2 to 10,000, and polyanion counterions.

6. An electrochromic assembly according to claim 1 wherein the electrically conductive electrochromic polydioxythiophene comprises structural units of the formulas

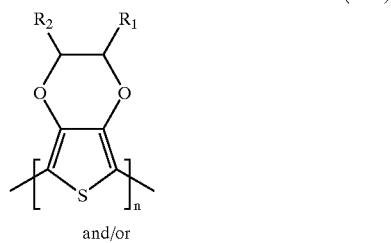

(XVa)

and/or

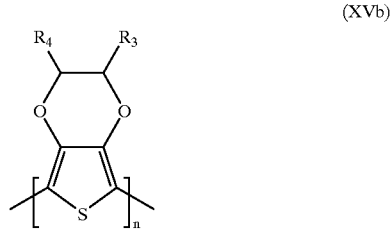

(XVb)

wherein
$R_1$ and $R_2$ represent, independently of one another, hydrogen or a substituted or unsubstituted $(C_1-C_{18})$-alkyl, $(C_2-C_{12})$-alkenyl, $(C_3-C_7)$-cycloalkyl, $(C_7-C_{15})$-aralkyl, $(C_6-C_{10})$-aryl, $(C_1-C_{18})$-alkyloxy, or $(C_2-C_{18})$-alkyloxy ester group,
$R_3$ and $R_4$ represent, independently of one another, hydrogen or a $(C_1-C_{18})$-alkyl, $(C_2-C_{12})$-alkenyl, $(C_3-C_7)$-cycloalkyl, $(C_7-C_{15})$-aralkyl, $(C_6-C_{10})$-aryl, $(C_1-C_{18})$-alkyloxy, or $(C_2-C_{18})$-alkyloxy ester group substituted by at least one sulphonate group, with the proviso that $R_3$ and $R_4$ cannot both be hydrogen, and
n represents an integer from 2 to 10,000, and polyanion counterions.

7. An electrochromic assembly according to claim 6 wherein polyanion counterions are anions of polymeric carboxylic acid and/or polymeric sulphonic acids.

8. An electrochromic assembly according to claim 1 wherein the electrically conductive electrochromic polydioxythiophene comprises structural units of the formulas

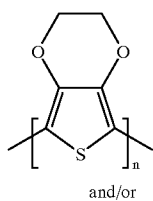

(XV a-1)

and/or

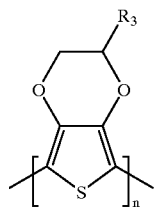

(XV b-1)

wherein
$R_3$ represents hydrogen or a $(C_1-C_{18})$-alkyl, $(C_2-C_{12})$-alkenyl, $(C_3-C_7)$-cycloalkyl, $(C_7-C_5)$-aralkyl, $(C_6-C_{10})$-aryl, $(C_1-C_{18})$-alkyloxy, or $(C_2-C_{18})$-alkyloxy ester group substituted by at least one sulphonate group, and
n represents an integer from 2 to 10,000, and polyanion counterions.

9. An electrochromic assembly according to claim 8 wherein polyanion counterions are anions of polymeric carboxylic acid and/or polymeric sulphonic acids.

10. An electrochromic assembly according to claim 1 wherein the electrochromic assemblies contain at least one transparent electrically conductive coating on a substrate.

11. An electrochromic assembly according to claim 1 wherein an electrically conductive polydioxythiophene is a conductive electrode material.

12. An electrochromic assembly according to claim 1 wherein a plate which has been mirrored by means of a metal is used as a conductive layer for connection to a power source.

13. An electrochromic assembly according to claim 1 additionally comprising a transparent gel electrolyte layer containing a crosslinked or uncrosslinked polymer, a lithium salt, and a solvent or solvent mixture.

14. An electrochromic assembly according to claim 13 wherein the polymer is a photocrosslinkable polymer.

15. An electrochromic assembly according to claim 13 wherein the gel electrolyte contains organic and/or inorganic fillers and/or additives.

* * * * *